United States Patent [19]

Mailliet et al.

[11] 4,214,608

[45] Jul. 29, 1980

[54] APPARATUS FOR OPENING AND CLOSING A FLUID CONDUIT

[75] Inventors: Pierre Mailliet; Leon Ulveling, both of Howald, Luxembourg

[73] Assignee: Paul Wurth, S.A., Luxembourg

[21] Appl. No.: 911,188

[22] Filed: May 31, 1978

[30] Foreign Application Priority Data

Jun. 6, 1977 [LU] Luxembourg .......................... 77488

[51] Int. Cl.³ ........................... F16K 3/02; F16K 3/10
[52] U.S. Cl. .................................... 137/546; 251/172; 251/300; 251/326; 266/157
[58] Field of Search ................ 137/546, 592; 251/172, 251/300, 301, 159; 266/157, 149, 144

[56] References Cited

U.S. PATENT DOCUMENTS

| 2,014,287 | 9/1935 | Newman | 137/546 X |
| 2,109,042 | 2/1938 | Bennett et al. | 251/172 X |
| 2,883,147 | 4/1959 | Mirza et al. | 251/301 X |
| 2,964,304 | 12/1960 | Rice | 266/157 X |
| 3,152,624 | 10/1964 | Ridley | 251/301 X |
| 3,623,499 | 11/1971 | Bernard | 251/172 X |

FOREIGN PATENT DOCUMENTS 2136216 11/1973 Fed. Rep. of Germany.

*Primary Examiner*—Arnold Rosenthal

[57] ABSTRACT

An apparatus for opening and closing a downcomer conduit through which crude blast furnace gas is delivered to a dust catcher. A frame is provided which is completely integrated with the upper part of the dust catcher enclosure and which is a prolongation of the walls of the enclosure. The frame provides a fluid-tight compartment which allows for hermetic sealing of the valve from the environment external to the conduit.

12 Claims, 20 Drawing Figures

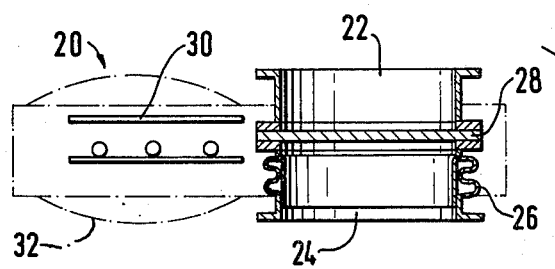
Fig. 1a
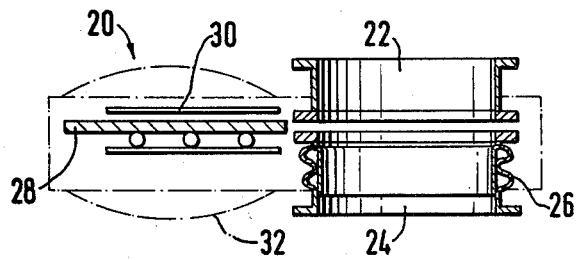
Fig. 1b
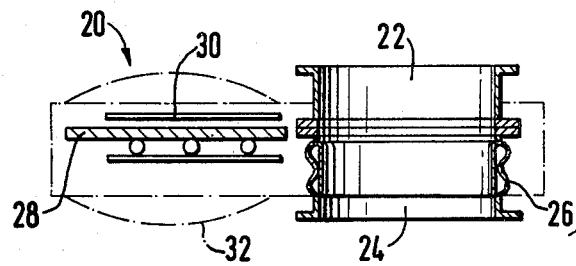
Fig. 1c
Fig. 1
PRIOR ART

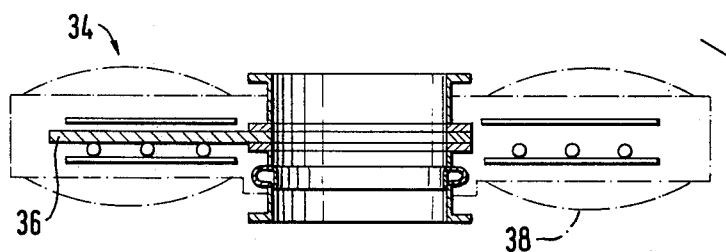
Fig. 2a
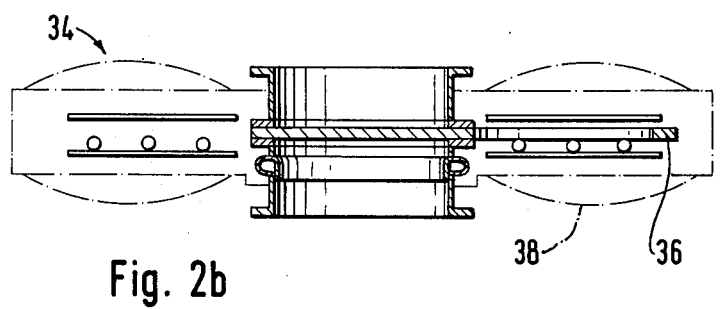
Fig. 2b
Fig. 2
PRIOR ART
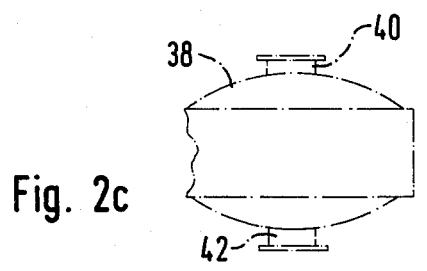
Fig. 2c

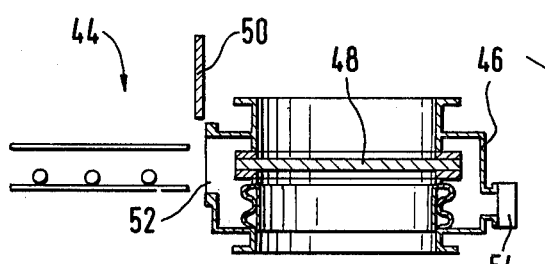
Fig. 3a
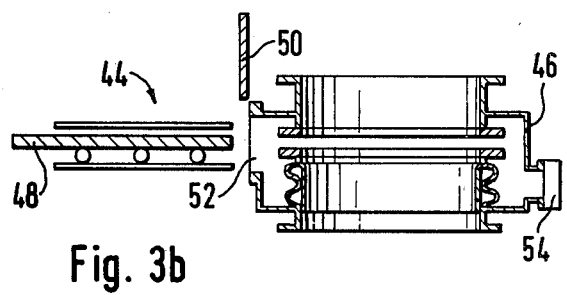
Fig. 3b
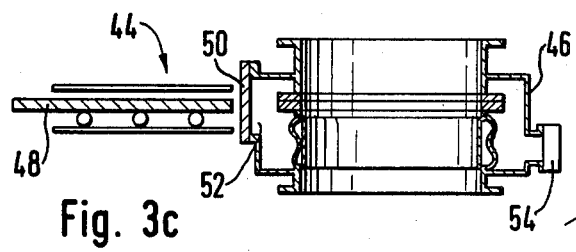
Fig. 3c
Fig. 3
PRIOR ART

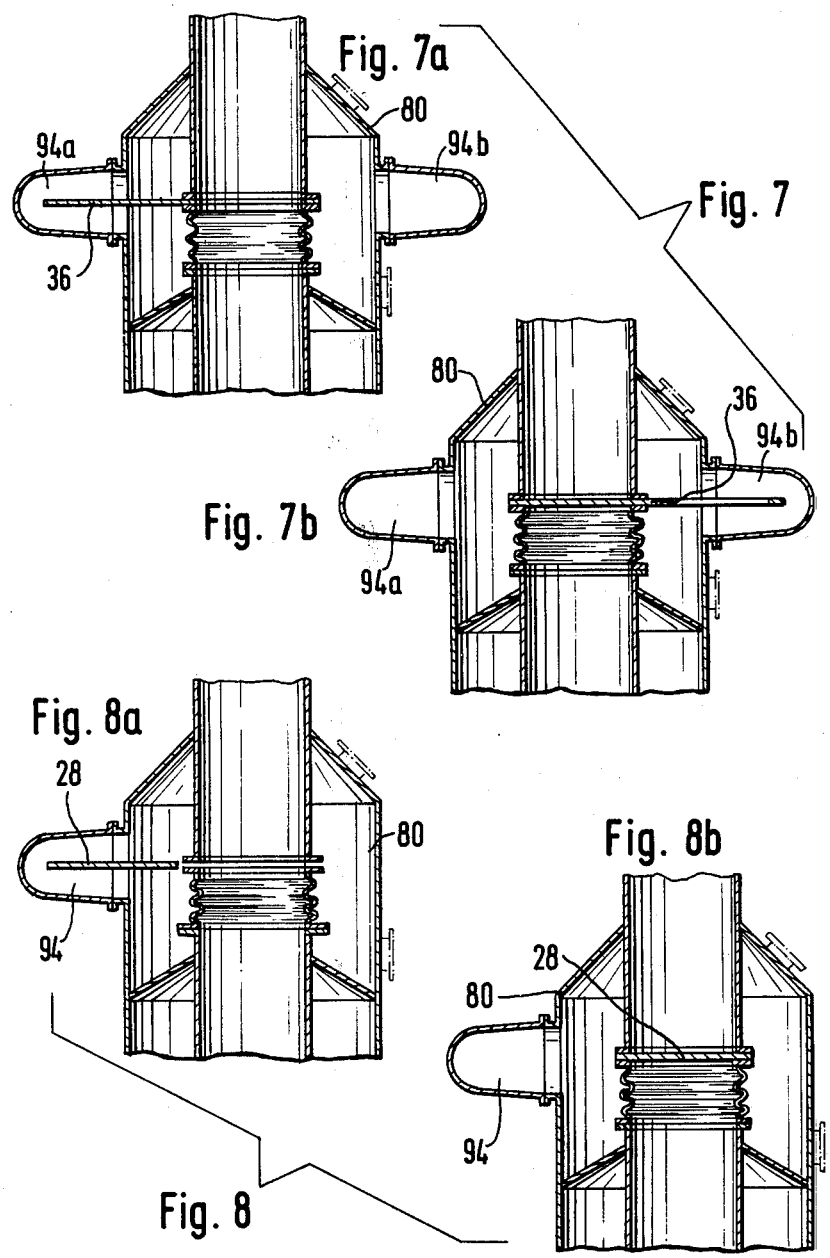

APPARATUS FOR OPENING AND CLOSING A FLUID CONDUIT

BACKGROUND OF THE INVENTION (1) Field of the Invention

The present invention relates to the opening and closing a fluid conduit having a large cross section. More particularly, the present invention relates to an apparatus for opening and closing a downcomer conduit that directs crude gas from a blast furnace in a generally vertical direction into a "dust bag" which removes particulate matter from the crude gas. Accordingly, the general objects of the present invention are to provide novel and improved methods and apparatus of such character.

(2) Description of the Prior Art

In the manufacture of steel, crude gas exiting the top of a blast furnace is directed through a collector pipe to an enclosure which is known in the industry as a "dust bag". The crude gas comprises a mixture of gas, steam and particles of dust having varying size, the gas being released at a relatively high pressure and temperature from the blast furnace. The "dust bag" functions to remove particulate matter from the crude gas. in many steel manufacturing processes, a collector pipe, known in the art as a "downcomer", extends in a generally vertical direction to a dust bag which is situated downstream of the blast furnace, the diameter of the dust bag being, in general, greater than the diameter of the collector pipe. In the case of a blast furnace, it is often necessary to rapidly isolate the dust bag from the blast furnace. Thus, near the junction of the collector pipe and the dust bag, the collector pipe includes a valve for opening and closing the pipe. The conventional pipes, in general, include a transverse slit which provides for the insertion and withdrawal of a shut-off plate so that when the shut-off plate is positioned within the pipe, the pipe is closed. When the shut-off plate is retracted from the pipe, the pipe is opened. One valve for opening and closing a collector pipe is disclosed in German Pat. No. 2,136,216. Among other known valves, the most usual types of valves are "goggle" valves: a plate having an aperture at one end slides horizontally back and forth within the slit in the pipe to open and close the pipe. Another conventional type of valve comprises a simple circular disc or shutter which may be slid horizontally into the pipe.

The aforementioned shut-off valves satisfy the accident prevention requirement that no one may work in a crude gas installation except behind a full joint, that is, the pipe must be completely cut in the transverse direction so as to minimize or eliminate the risk of gas leaking from the furnace to an area near the person working. However, in the case of collector pipes functioning under high pressure and high temperatures, such as that present in blast furnace crude gas, the aforementioned valves fail to sufficiently seal the collector pipe with respect to the environment external to the pipe. During movement of the valve plate to either open or close the valve, it is difficult or impossible to prevent appreciable leakage of crude gas to the external environment. The conventional solution to this problem is to provide a hermetically tight armoring completely surrounding the valve and its accessories in order to insure hermetic sealing from the inside of the pipe to the external environment and between the upstream and downstream portions of the pipe.

Although the prior art armoring has solved the hermetic sealing problem, the armoring has, in turn, given rise to further problems. In the case of pipes having a large cross section and being exposed to considerable pressures, as occurs in crude gas collecting pipes in modern blast furnaces, the weight and space required by the armoring is relatively large. Since the armoring must surround the entire valve and enable the valve to perform the sliding movement perpendicular to the pipe, a cumbersome and expensive superstructure is required. A tendency in steel manufacturing is to operate at increasingly high pressures, and the foregoing problem becomes aggravated as pressure increases. As the armoring must be made correspondingly strong and robust, a further increase in weight and size is necessary. It is not unusual for the entire structure to weigh tens of thousands of kilograms.

It is an object of the present invention to provide an apparatus for opening and closing a collector pipe of wide cross section of the type which has a relatively low total weight.

It is another object of the present invention to provide an apparatus for opening and closing a collector pipe wherein the space occupied and the total weight of the superstructure necessary to support the valve is reduced considerably while at the same time insuring hermetic sealing.

SUMMARY OF THE INVENTION

In order to achieve the foregoing objects and further objects which will be readily apparent from the detailed description of the invention, an apparatus for opening and closing a "downcomer" conduit is provided, the apparatus including a frame which is completely integrated with the upper part of the dust bag enclosure. The frame surrounds the collector pipe and is formed by an upper prolongation of the walls of the dust bag. The frame provides a gas tight compartment which hermetically seals the valve from the environment external to the frame. By using a frame which is integral with the dust bag, much of the superstructure necessary with conventional valves is avoided.

In a first embodiment of the invention, the frame is designed for mounting complete valves of the known type including their armorment and accessories. The pipe is provided, at a position external to the valve, with a mounting compensator which enables the valve to be tightened or released. The frame is preferably fitted with a pair of rails mounted transversely to the pipe and situated on two sides of the pipe. The rails support and guide the valves by means of a set of rollers when the valve is being mounted or dismantled. This construction enables the use of existing valves without any significant modification so that the apparatus of the present invention is easily adaptable to existing construction and equipment.

In a second embodiment of the invention the frame is designed to accommodate only components and accessories of known types of valves, and, is not intended to accommodate valve armorings. The frame is advantageously a closed surface so as to replace the armorings of the conventional valves which are disposed within the frames. Whether the frame is opened or closed, the structure which supports the frame may be made far lighter in weight particularly because of the elimination of valve armoring. The second embodiment of the invention offers a particular advantage for valves having a spherically shaped shut-off plate. In this case, the intermediate wall separating the frame from the dust bag may slope at an angle to reduce wasted space.

Further features and advantages of the invention will be apparent from the detailed description of the invention which is described with respect to the following drawings.

BRIEF DESCRIPTION OF THE DRAWINGS

FIG. 1 shows a prior art valve having a circular disc shape, FIGS. 1A, 1B and 1C showing the valve in different positions;

FIG. 2 shows a prior art valve of the type including a flat plate having an aperture in one end thereof, the valve being shown in FIGS. 2A, 2B and 2C in different positions;

FIG. 3 shows another embodiment of a prior art circular disc shaped valve, FIGS. 3A, 3B and 3C showing different positions of the valve;

FIG. 7 shows an installation in accordance with a third embodiment of the present invention including a valve of the type which is defined by a plate having an aperture in one end thereof, FIGS. 7A and 7B showing different positions of the plate;

FIG. 8 shows an installation in accordance with a further embodiment of the present invention including a circular plate type valve, FIGS. 8A and 8B showing different positions of the valve plate;

DETAILED DESCRIPTION OF THE INVENTION

Figure 4:
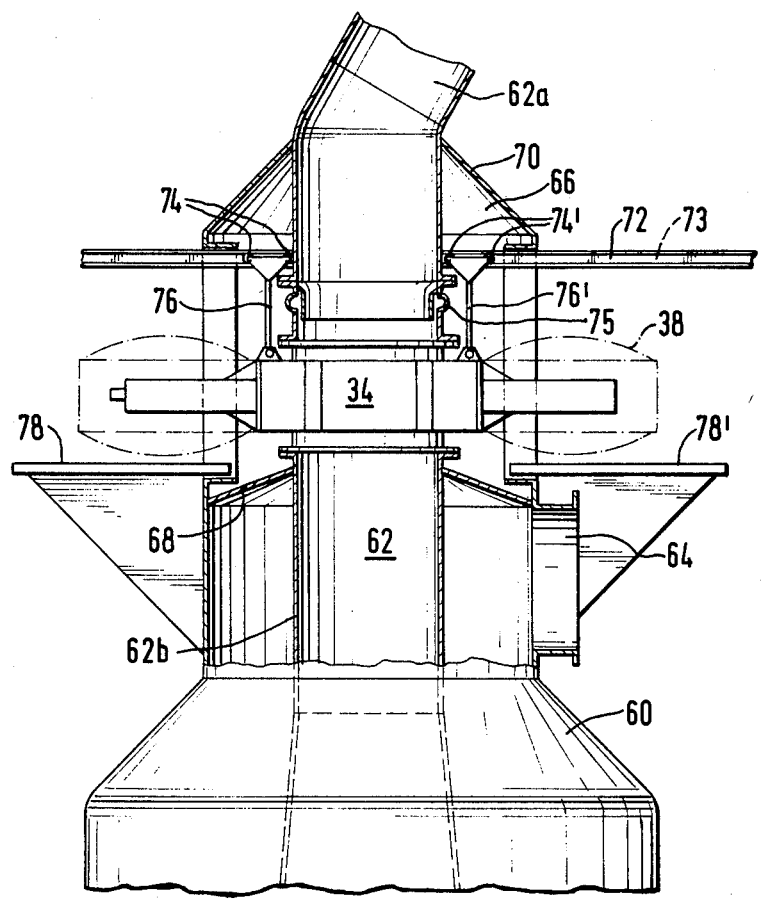
FIG. 4 shows a cross sectional view of an installation in accordance with a first embodiment of the present invention including a complete valve of the type shown in FIGS. 1, 2 or 3.

FIG. 1 shows a valve 20 which includes a shut-off plate 28 that has the shape of a circular disc. The collector pipe comprises an upper portion 22 and a lower portion 24, both having a tubular shape. Roller mechanism 30 provides for movement of cover 28 in a plane perpendicular to the axis of the pipe. Compressible connector 26 allows for movement of the sealing surface of the bottom portion 24 so as to accommodate the shut-off plate 28 when the valve is in the closed position and to align the flange of the lower portion 24 with the flange of the upper portion 22 when the valve is in the opened position. An optional armoring 32 is shown in dot and dash lines and is desirable if hermetic sealing is required between the interior of the pipe and the environment external to the pipe. FIG. 1A shows the valve in the closed position. FIG. 1B shows the valve in an intermediate position which is occupied immediately after opening of the valve or prior to closure of the valve. FIG. 1C shows the valve in the open position.

FIG. 2 shows a valve 34 of the spectacle-blind type which has a shut-off plate 36 comprising a planar plate having an aperture at one end. As shown in FIG. 2A when the aperture is engaged in the pipe, valve 34 is in the open position. When the full part of the plate is engaged in the pipe, valve 34 is in the closed position. The armoring around the valve is shown in dot dash lines by reference character 38. Armoring 38 is optional, but, is desirable to include with the valve when it is desired to hermetically seal the interior of the pipe with respect to the external environment. It is preferable, as a precautionary measure, as shown in FIG. 2C, to provide armoring 38 with ventilation apertures 40 and 42 so that the armoring can be drained. It should be understood that the armoring shown in FIG. 1 may also include ventilation apertures.

FIG. 3 shows a valve 44 of the type having a circular planar plate which moves inwardly and outwardly to open and close the collector pipe. Valve 44 operates in a manner similar to the valve described with respect to FIG. 1. FIG. 3A shows the valve in the closed position, FIG. 3B shows the valve in the intermediate position. FIG. 3C shows the valve in the open position. Valve 44 differs from the valve described in FIG. 1 in that its armoring 46 is much smaller because the armoring does not extend around shut-off plate 48 when the valve is in the open position. Shut-off plate 48 is moved inwardly and outwardly with respect to the pipe through aperture 52 in armoring 46, the aperture capable of being closed by cap 50 which hermetically seals armoring 46. As in the case of the previously described valves, it is preferable to provide a ventilating aperture 54 which may be fitted with a valve and connected to a fan in order to remove any gases that may accumulate within the armoring. The ventilating aperture 54 fitted with a valve prevents gases from short circuiting shut-off plate 48 and passing through the sealing interfaces on either side of shut-off plate 48. Thus, the ventilation aperture 54 provides additional protection for any maintenance personnel which may work upstream or downstream from the closed valve.

It should be understood that the valves described in FIGS. 1, 2 and 3 form complete units with or without the optional armoring. The valve and the mechanism for moving the shut-off plate of the valve is supported by a superstructure which is not shown in the FIGURES. From the above description, it should be understood that the entire valve system occupies a considerable amount of space and is extremely heavy. Collector pipes for crude gas of modern blast furnaces may range three or more meters in diameter and weigh in the range of 50 tons for a valve of the type shown in FIG. 2. It is not only necessary to provide supports for the valve itself, but also, it is necessary to provide supports for the upper part of the collecting pipe. Furthermore, platforms and footbridges must be provided, together with mechanical structure which allows for dismantling of the valves. As can be appreciated from the above description, all of these items are cumbersome and result in heavy and expensive superstructure which must be positioned above and around the dust bag.

FIG. 4 shows a first embodiment of the present invention, the first embodiment enabling bulky and costly superstructures to be replaced with more compact and lightweight structure. FIG. 4 shows a collector pipe 62 having a lower part 62b which is fitted within dust bag 60. Collector pipe 62 includes an upper part 62a which extends toward the blast furnace. A valve 34 is positioned between the upper part 62a and the lower part 62b of collector pipe 62. Since valve 34 is similar to the valve 34 described with respect to FIG. 2, the operation of valve 34 will not be further described. Valve 34 is accommodated in a framework 66 which extends from dust bag 60. Dust bag 60 has a diameter that is generally larger than the diameter of collector pipe 62. Framework 66 is integral with the walls of dust bag 60 and which is an upward prolongation of the walls of dust bag 60. Wall 68 which heretofore formed the upper wall of dust bag 60 immediately above the outlet orifice 64 of dust bag 60 is now an intermediate wall. Framework 66 which extends upwardly from dust bag 60 defines an upper wall 70 which supports the upper part 62a of collector pipe 62 and which also defines a chamber between walls 68 and 70. Rails 72 and 73, the view of the latter rail being obstructed by the former rail, extend through framework 66 and are positioned on opposite sides of collector pipe 62. Rails 72 and 73 support the entire valve 34 by means of rollers 74 and 74' and rods 76 and 76' which may be adjusted in length during mounting or dismantling operations of valve 34. This type of assembly also enables valves 34 to be released by sliding the valve to the left or to the right as shown in FIG. 4. Platforms 78 and 78' which are supported by dust bag 60 allow for access to valve 34. It should be understood that platform 78 and 78' can also be mounted or suspended from the upper wall 70 of framework 66. When conventional valves are used, the operation of mounting and dismantling valve 34 is facilitated by a mounting compensator 75 which is associated with a set of jacks (not shown).

It is possible to eliminate enormous superstructures such as columns and uprights heretofore necessary to support valve 34 above dust bag 60. With the apparatus of the present invention, framework 66 which extends from and which is integral with dust bag 60 provides support for valve 34. It should be understood that valve 34 can be replaced by the valves shown in FIGS. 1 or 3 or any other conventional valve without significant alterations to the framework 66 and rails 72 and 72'.

Armoring 38 is an optional feature and it is possible to use a valve in the framework of the present invention with or without its armoring. However, it should be understood that the armoring 38 can be replaced by a suitable framework 66 that provides for hermetic sealing of the valve.

Figure 5:
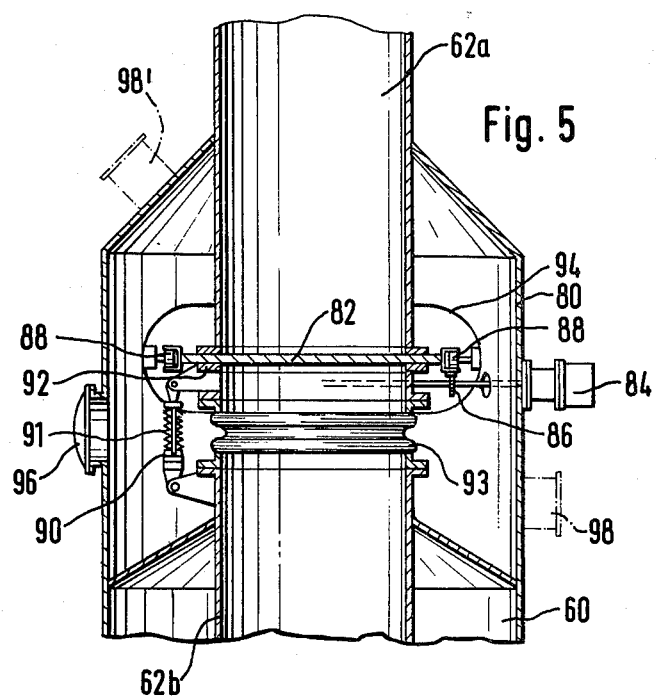
FIG. 5 shows a side sectional view of an installation in accordance with a second embodiment of the present invention including components of conventional valves of the type shown in FIG. 1 or 2.
Figure 6:
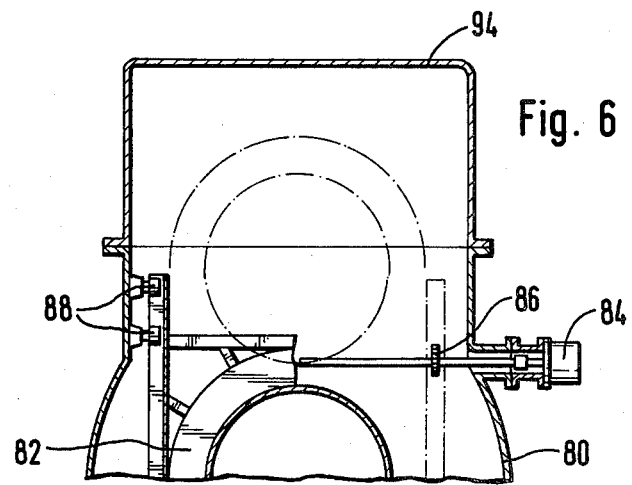
FIG. 6 shows a top sectional view of the apparatus shown in FIG. 5.

FIGS. 5 and 6 show a second embodiment of the invention wherein a valve is incorporated in its entirety in a framework, the framework obviating the need for armoring and for extensive and heavy superstructure. A valve is fitted between the upper portion 62a and the lower portion 62b of a collector pipe which flows into dust bag 60. Framework 80 which is integral with the upper part of dust bag 60 and which extends upwardly from the walls of dust bag 60 provides for support of the upper portion 62a of the pipe and the valve. Framework 80 is designed to accommodate certain components of prior art valves and is designed to eliminate the need for bulky and heavy armoring. In addition to its supporting function, framework 80 serves as an armoring for the valve. Thus, the valve incorporated in framework 80 need not include the armorings 32 and 38 shown in FIGS. 1 and 2. Shut-off plate 82 which transversely slides into a slit between the upper part 62a and the lower part 62b of the collector pipe functions in a conventional manner and is driven by an electrical or hydraulic motor 84 mounted on the exterior of framework 80. Motor 84 is connected to shut-off plate 82 through the wall of framework 80 and via gearing 86, such as a sprocket wheel, in order to cause shut-off plate 82 to slide with respect to supporting rollers 88. In FIG. 5, by way of illustration, hydraulic jack 90 is shown which enables flange 92 to move in the axial direction to provide for releasing or gripping of shut-off plate 82. Spring 91 which may be a stack of washers known as "belleville" washers, exert pressure on the sealing interfaces and thus provide for excellent hermetic sealing. It should be understood that a plurality of jacks 90 are positioned around the valve. The release of shut-off plate 82 and the contraction of compensator 93 are effected by jacks 90 in opposition to the force of springs 91. Referring to FIG. 6, in the case where framework 80 provides armoring for shut-off plate 82, framework 80 will be provided with one or more lateral chambers 94 to enable shut-off plate 82 to slide transverse with respect to the pipe so that when the valve is in the open position, the shut-off plate 82, in its entirety, is sealed with respect to the external environment. To allow access to the interior framework 80, the framework is provided with an access aperture 96. Framework 80 may also be provided with two ventilating apertures 98 and 98' which allow the drainage of the interior of framework 80. Apertures 96, 98 and 98' may be closed by covers which allow for hermetic sealing.

The embodiment shown in FIGS. 5 and 6 allows for the use of conventional components of known types of valves, whether the valve be of the type shown in FIGS. 1, 2 or 3, or any other type of similar valve. Comparing the second embodiment described in FIGS. 5 and 6 with the embodiment described in FIG. 4, the embodiment shown in FIGS. 5 and 6 allows for the mounting compensator 75 and the superstructure for the valve to be dispensed with.

Because the apparatus of the present invention includes fewer parts, an enormous savings of size and weight is achieved. Furthermore, considerably smaller lifting devices are required for mounting and dismantling the valve. The weight of components used is reduced to approximately one tenth of the weight of known valves. The second embodiment of the invention shown in FIGS. 5 and 6 offer the additional advantage that the shut-off plate 82 and accessories for moving the shut-off plate are easily accessible thereby enabling maintenance work on the valve and replacement if necessary. In conventional valves, all of the components and accessories are closely connected with the interior of the armoring. Access to the valve is extremely difficult, and, in some instances, it is necessary for the entire valve to be dismantled in order to service a small part of the valve.

FIG. 7 shows the use of the apparatus of the present invention in conjunction with a spectacle-blind type of valve 36 which may be identical to the spectacle-blind valve described with reference to FIG. 2. In order to allow transverse movement of the shut-off plate 36 from the opened position as shown in 7A to the closed position as shown in FIG. 7B, two lateral chambers 94a and 94b are provided.

FIG. 8 shows the apparatus in connection with a valve of the type described with reference to FIG. 1. To allow for valve 28 to be moved from the open position shown in FIG. 8A to the closed position shown in FIG. 8B, lateral chamber 94 in the wall of framework 80 is provided, the framework 80 allowing for hermetic sealing of the valve with respect to the environment external to the pipe.

It should be understood if a hermetically sealed valve is not required, the lateral chambers shown in FIGS. 7 and 8 are not required. If, on the other hand, it is desired to hermetically seal the valve, it is necessary to provide lateral chambers and it is also desirable to provide ventillation apertures.

Figure 9:
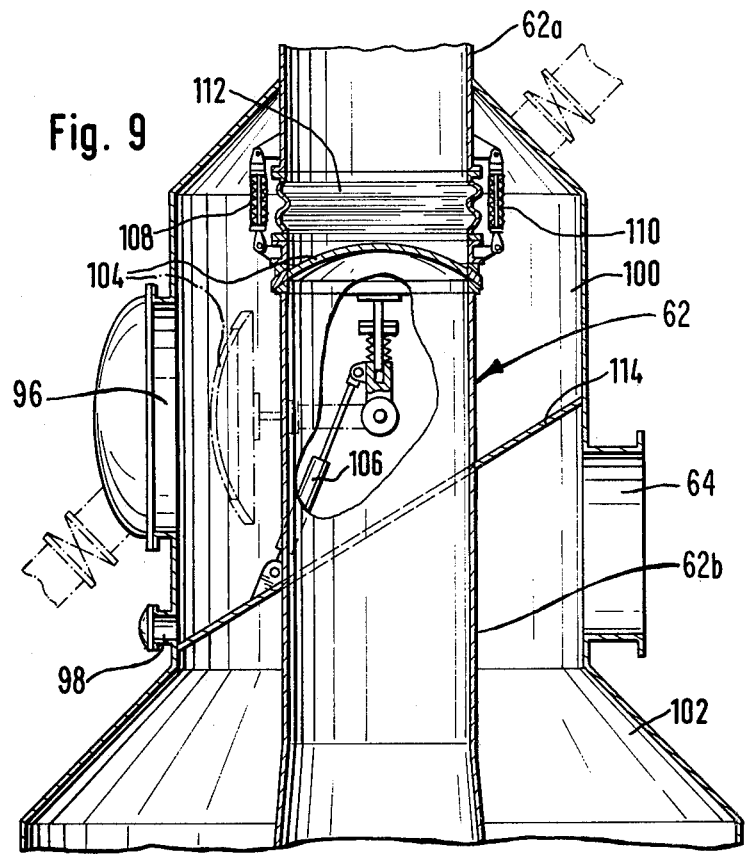
FIG. 9 shows an installation in accordance with yet another embodiment of the present invention including a spherically shaped shut-off plate type valve.

FIG. 9 shows another embodiment of the present invention including a framework 100 which extends upwardly from dust bag 102. In this embodiment of the invention, valve 104 has a spherical shape and is of the type described in U.S. patent application Ser. No. 409,934 of Edouard Legille filed May 26, 1978 and entitled "Valve for Opening and Closing a Fluid Conduit". As shown in FIG. 9, valve plate 104 is actuated by a hydraulic jack 106, which may be supplemented by a second jack (not shown), which serves to rotate valve plate 104 through an arc of 90 degrees in order to move the valve between the open and closed positions. Hydraulic jacks 108 and 110 allow the movable part 62a of the pipe 62 to move upwardly to contract compensator 112, jacks 108 and 110 preferably being combined with springs. Valve plate 104, which is shown in full lines in the closed position and in dot and dash lines in the opened position, is described in detail in the aforementioned patent application which can be referred to for additional information.

Because valve 104 moves along an arcuate path, the intermediate wall 114 separating the framework 100 from the dust bag 102 can be positioned at an inclined angle in order to provide additional space in the head of the dust bag. FIG. 9 also shows an access aperture 96 and a ventilating aperture 98.

Figure 10:
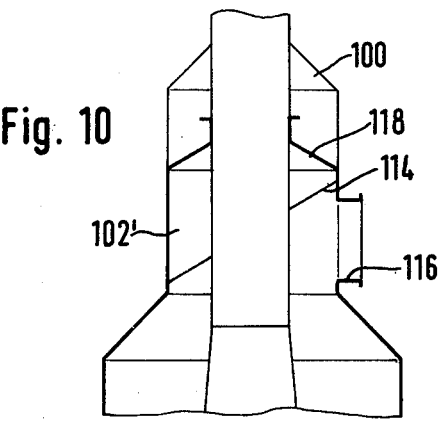
FIG. 10 is a schematic diagram of the upper part of a dust bag according to the present invention and that according to the prior art.

FIG. 10 shows a schematic diagram of the apparatus of the present invention as compared with a prior art apparatus. The heavy lines indicate the contour of dust bag 102' having upper wall 118 positioned immediately above orifice 116 which allows for the extraction of gases after dust has been removed. The apparatus shown in heavy lines is the prior art apparatus. The apparatus shown in thin lines represents the framework 100 shaped in accordance with the present inention by the prolongation of the walls of dust bag 102'. The upper wall 118 of the dust bag has been eliminated and is replaced by an intermediate wall 114 positioned angularly with respect to planes passing perpendicular to the axis of the pipe. This allows for the use of space delineated by the lines 114 and 118 which was heretofore wasted. The additional volume required for the application of the present invention is delineated by the space between line 118 and framework 100. Thus, with a minimum increase in space and weight, hermetic sealing of the shut-off valve with respect to the external environment may be achieved.

Figure 12:
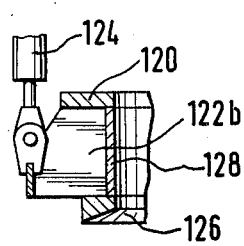
FIG. 12 shows a side view of one of the jacks shown in FIG. 11.
Figure 11:
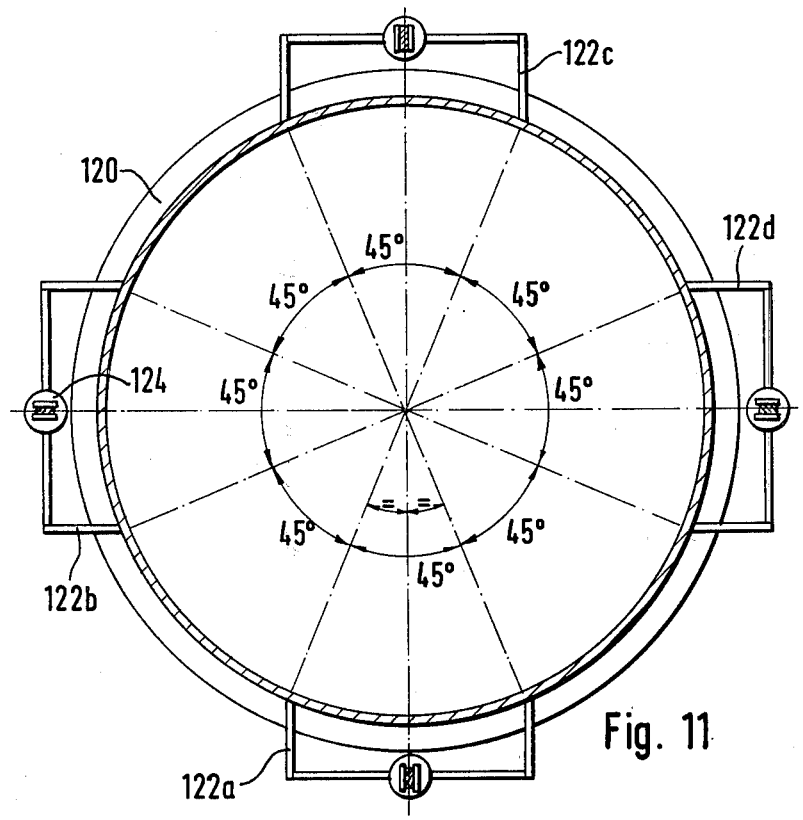
FIG. 11 is a cross section of a collector pipe and shows the positions of jacks which operate on the movable part of the collector pipe.

FIGS. 11 and 12 show an additional structure that is made possible by the apparatus of the present invention. Heretofore, a number of jacks which varied in number from 8 to 16 in accordance with the diameter of the pipe had to be provided in order to move the compensator. These hydraulic actuators or jacks are numbered 108 and 110 in FIG. 9 or 90 in FIG. 5. In the prior art, because of the lack of space available for conventional valves such as those illustrated in FIGS. 1, 2 and 3, particularly because of the extensive armoring around these valves, the flange had to be constructed of a relatively lightweight material. Because of the lightweight flange, a large number of jacks had to be provided in order to distribute lifting forces in a uniform manner over the entire periphery of the flange so as not to deform the flange or pipe. As shown in FIG. 11, which is a top view of movable flange 120 divided into eight sectors, each sector comprising 45 degrees, with the use of a conventional valve, at least eight jacks had to be provided in order to operate flange 120, these jacks being caused to act for example at the extremities of the radii as shown in dot and dash lines in FIG. 11. The present invention enables the number of hydraulic jacks to be reduced to 4. Since the apparatus of the present invention lessens the weight of the apparatus above flange 120 and the space of the apparatus, a more massive construction of the movable flange can be adopted. Thus, the flange can withstand higher pressures by hydraulic jacks without undergoing deformation. It is also possible for cross pieces such as those shown schematically be reference numbers 122a, 122b, 122c and 122d to be fitted between flange 120 and flange 126 and wall 128 of the pipe in the manner shown in FIGS. 11 and 12, and actuated by hydraulic jacks such as jack 124 shown in FIG. 12. Each of these cross pieces enables a sector of 45 degrees to be covered. Thus, each jack extends over a sector of 90 degrees rather than a sector of 45 degrees. The reinforcement of the flange enables the number of jacks to be halved. The cross pieces enable the number of jacks to be reduced to a quarter of that necessitated by existing systems.

Various modifications may be introduced without departing from the present invention. In particular, in the case of an armoring or a closed framework, the operation of the ventilation apertures can be made subject to the control of the shut-off plate of the valve in such a way that the opening and closing movement of the ventilation apertures are a function of the opening and closing of the valve plate. This would eliminate the risk of inadvertant failure to actuate the ventilation aperture valves.

While preferred embodiments have been shown and described, various modifications and substitutions may be made thereto without departing from the spirit and scope of the invention. Accordingly, it will be understood that the present invention has been described by way of illustration and not limitation.

What is claimed is:

1. In apparatus for delivering crude blast furnace gas to a dust collector via a conduit, at least the portion of the conduit immediately upstream of the dust collector having its axis oriented generally vertically, the dust collector removing particulate matter from fluid flowing through the conduit and including an outer wall which defines an enclosure having a cross-sectional area greater than the diameter of the conduit, improved apparatus for controlling the flow through the conduit comprising:

valve means, said valve means including a movable valve member which in a first position establishes a hermetic seal across the conduit and thereby prevents gas flow through the conduit to the dust collector and which in a second position opens the conduit for flow therethrough; and support means for said valve means, said support means including a frame extending upwardly from said dust collector outer wall, said frame being integral with and defining a prolongation of said dust collector outer wall, said frame being attached to said conduit upstream of said valve means whereby said valve means may support said conduit.

2. An apparatus according to claim 1 wherein the frame is capable of accommodating a conventional valve including means for moving the valve member and armoring and is also capable of accommodating a mounting compensator which enables the valve to be tightened or released with respect to the conduit.

3. An apparatus according to claim 2 and further including a pair of rails mounted transversely to the axis of the conduit and located on opposite sides of the conduit, the rails engaging rollers which support the valve member and which allow movement of the valve member with respect to the rails.

4. An apparatus according to claim 1 wherein the frame is open and is not hermetically sealed with respect to the environment external to the conduit.

5. An apparatus according to claim 4 wherein said valve means is provided with an armoring.

6. The apparatus of claim 1 wherein said frame is hermetically sealed to said conduit and defines a chamber about the periphery of a portion of the conduit extending upwardly from the dust collector, said valve means being disposed within said chamber, said support means further including means for hermetically isolating the interior of said chamber from the environment external to the conduit.

7. An apparatus according to claim 6 wherein the frame includes at least one ventilating aperture.

8. An apparatus according to claim 7 wherein the valve member includes an aperture in one end thereof and the frame is provided with two lateral chambers to enable the valve member to move transversely with respect to the conduit.

9. An apparatus according to claim 7 wherein the valve member has a circular disc shape and the frame is provided with at least one lateral chamber to enable the valve member plate to move transversely with respect to the conduit.

10. Apparatus according to claim 7 wherein the valve means valve member has a spherical shape and said valve means includes an actuator for causing said valve member to move along an arcuate path between the said first and second positions.

11. In apparatus for delivering crude blast furnace gas to a dust collector via a conduit, at least the portion of the conduit located immediately upstream of the dust collector having its axis oriented generally vertically, the dust collector removing particulate matter from fluid flowing through the conduit and including an outer wall which defines an enclosure having a cross-sectional area greater than the diameter of the conduit, improved apparatus for controlling the flow through the conduit comprising:

valve means, said valve means including a movable valve member having a sealing surface which is in the shape of a portion of a sphere, said valve member being movable between a first position wherein it establishes a hermetic seal across the conduit thereby preventing gas flow through the conduit and a second position wherein it is removed from registration with the conduit to thereby permit gas flow through the conduit, said valve means further including actuator means for moving said valve member along an arcuate path between said first and second positions;

support means for said valve means, said support means including an upwardly extending integral prolongation of said dust collector outer wall, said support means being hermetically sealed to said conduit upstream of said valve means whereby said wall prolongation may support said conduit and define a chamber for said valve means, said support means further including means for hermetically isolating the interior of said chamber from the environment external to the conduit; and an intermediate wall positioned within the chamber defined by said support means, said intermediate wall being provided with an aperture through which the conduit passes, said intermediate wall lying in a plane which intersects the axis of the conduit at an angle, said intermediate wall isolating a portion of the interior of said chamber from the interior of the dust collector enclosure.

12. An apparatus for shutting off flow of fluid through a fluid conduit comprising:

a fluid conduit having a diameter, the fluid conduit descending generally vertically to an enclosure having an outer wall with a diameter greater than the diameter of the fluid conduit, the fluid conduit being provided with an opening transverse to the axis thereof, said opening defining a pair of facing conduit ends, one of said ends being provided with a fixed flange and a second of said ends being provided with a reinforced movable flange fitted with a compensator, the movable flange being displaceable by hydraulic jack means connected to the flange via cross pieces positioned tangentially with respect to the flange, the fluid conduit being opened and closed by a shut-off plate which is movable inwardly and outwardly with respect to the conduit in order to open and close the conduit, the shut-off plate being located downstream with respect to said transverse opening, said apparatus further comprising a supporting frame which extends upwardly from, is integral with and is a prolongation of the wall of the enclosure, said frame being capable of supporting the fluid conduit and the shut-off plate.

* * * * *

UNITED STATES PATENT AND TRADEMARK OFFICE
CERTIFICATE OF CORRECTION

PATENT NO. : 4,214,608
DATED : July 29, 1980
INVENTOR(S) : P. Mailliet et al

It is certified that error appears in the above-identified patent and that said Letters Patent are hereby corrected as shown below:

Column 9, line 40 (Claim 9, line 4), delete "plate"

Signed and Sealed this

Sixth Day of January 1981

[SEAL]

Attest:

SIDNEY A. DIAMOND

Attesting Officer — Commissioner of Patents and Trademarks